No. 608,191. Patented Aug. 2, 1898.
J. G. & E. G. FIEGEHEN.
APPARATUS FOR PRODUCING TRAVERSING MOTION OF OVERHEAD TRAVELING CRANES.
(Application filed Dec. 24, 1897.)
(No Model.) 3 Sheets—Sheet 1.

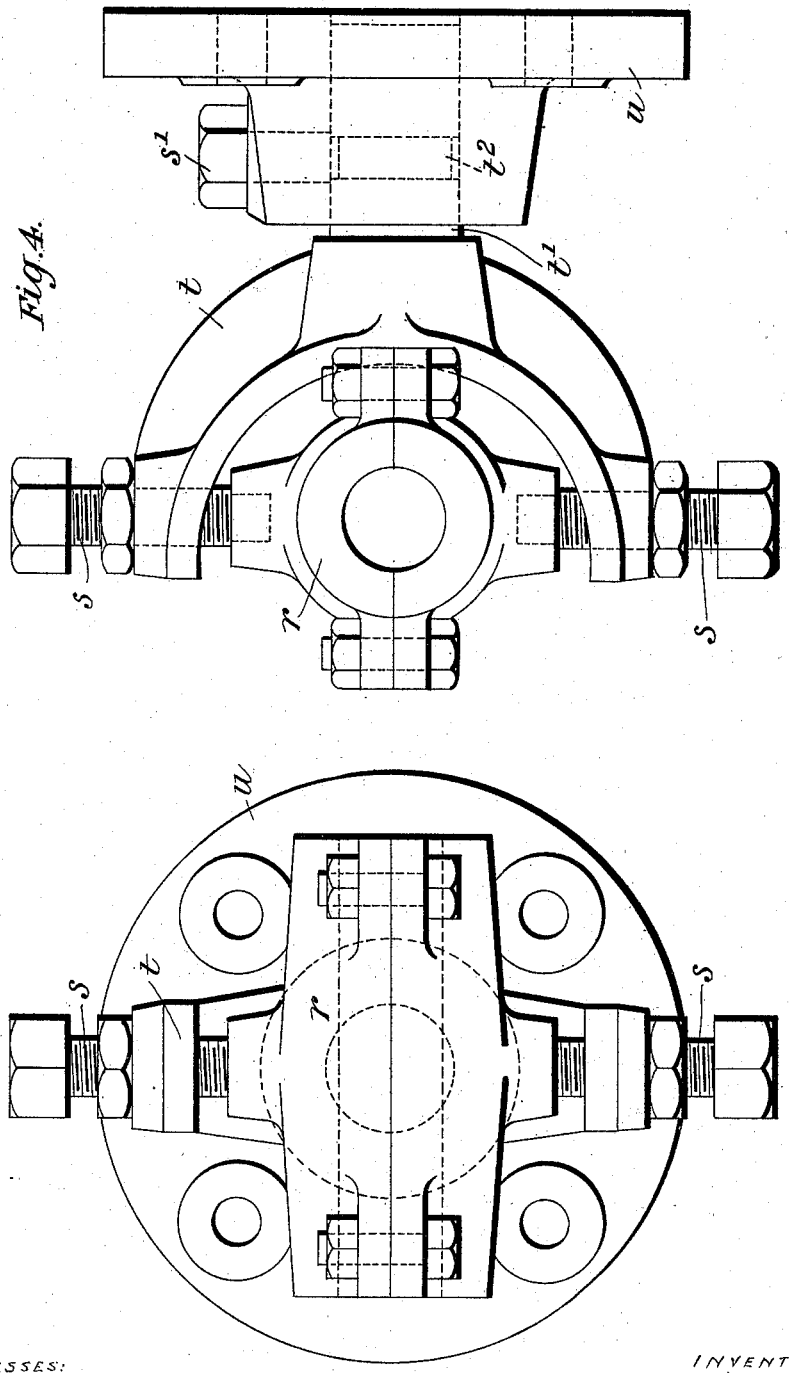

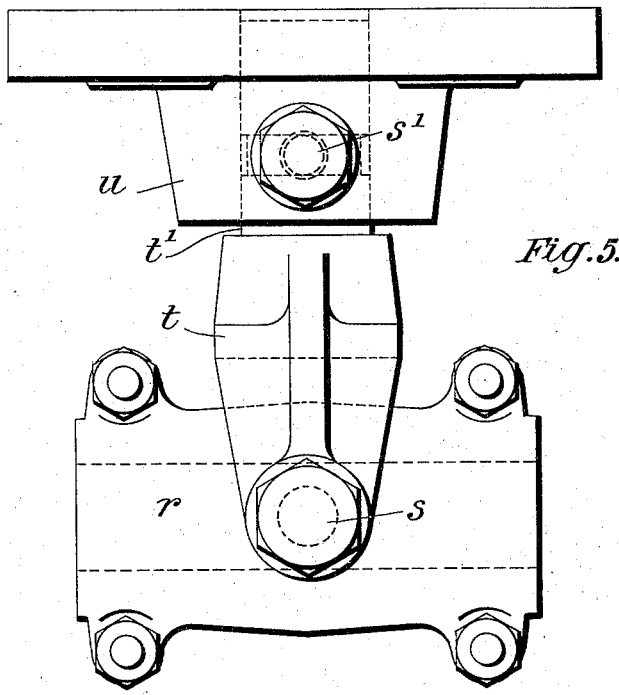
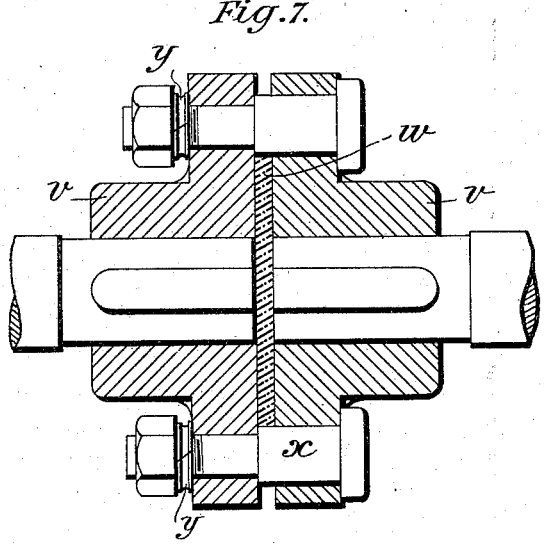
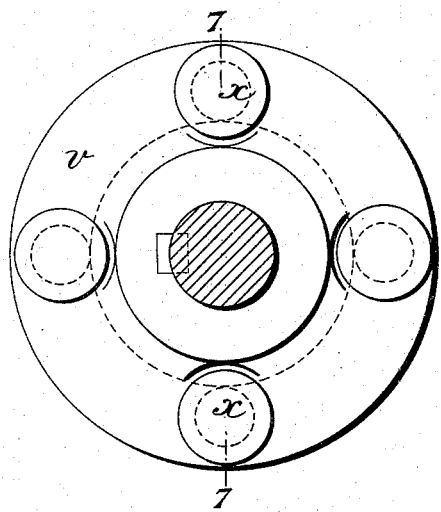

UNITED STATES PATENT OFFICE.

JOHN GEORGE FIEGEHEN AND EDWARD GEORGE FIEGEHEN, OF BEDFORD, ENGLAND.

APPARATUS FOR PRODUCING TRAVERSING MOTION OF OVERHEAD TRAVELING CRANES.

SPECIFICATION forming part of Letters Patent No. 608,191, dated August 2, 1898.

Application filed December 24, 1897. Serial No. 663,292. (No model.) Patented in England December 12, 1896, No. 28,436.

*To all whom it may concern:*

Be it known that we, JOHN GEORGE FIEGEHEN and EDWARD GEORGE FIEGEHEN, of Bedford, England, have invented certain new and useful Improvements in Means or Apparatus for Producing the Traversing Motion of Overhead Traveling Cranes, (for which we have obtained a patent in Great Britain, No. 28,436, bearing date December 12, 1896,) of which the following is a specification.

This invention relates to means or apparatus for producing the longitudinal traversing motion of overhead traveling cranes operated by electricity.

We will proceed to describe our invention in its application to an electric overhead traveling crane comprising a crab adapted to travel on a crane-truck, which in its turn is adapted to travel on gauntree-rails arranged along the two sides of the area to be served by the crane.

Figure 1:
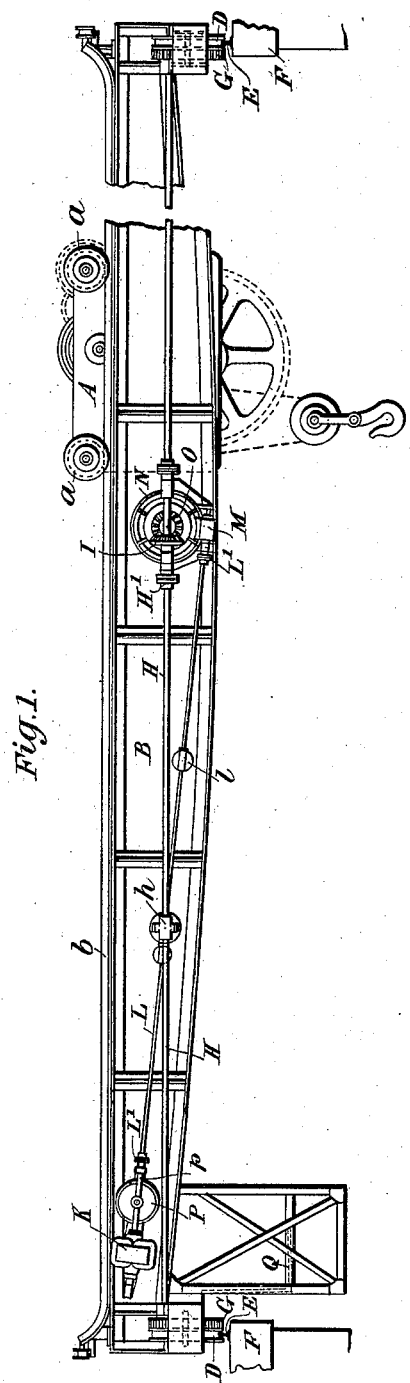
Figure 2:
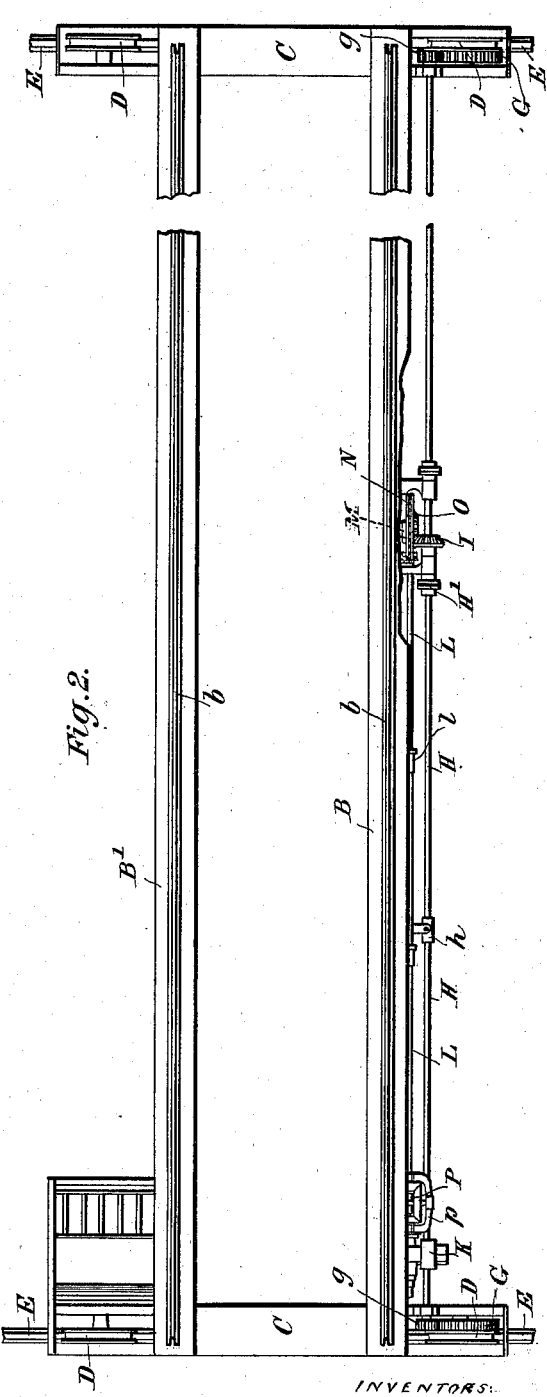

In the accompanying drawings, Figure 1 is a side elevation illustrating our improved traversing motion applied to a crane. Fig. 2 is a plan of the same, part of the top flange of one main crane-girder being shown broken away in order to allow the traversing gear to be seen. In this figure the crab is omitted. Fig. 3 is a front end elevation of a construction of swiveling bearing suitable for use in connection with the shafts H and L, hereinafter referred to. Fig. 4 is a side elevation, and Fig. 5 a plan, of Fig. 3. Fig. 6 is an end elevation of a construction of flexible coupling suitable for use in connection with the shafts H and L, hereinafter referred to. Fig. 7 is a central longitudinal section on the line 7 7 of Fig. 6. Figs. 3 to 7, inclusive, are on a larger scale than Figs. 1 and 2.

A is the crab. It is adapted to travel by means of its wheels *a* on rails *b*, carried by the crane-truck. The crane-truck consists of two horizontal main girders B B', arranged parallel to each other and connected together at their ends by two horizontal cross-girders or cradles C C. The entire crane (comprising the crab and its truck) is adapted to travel, by means of the traveling wheels D D, (mounted in the cradles C C,) on the rails E E, carried by the gauntree framing or walls F F. This movement or longitudinal traverse of the crane on the gauntree-rails E E is effected by means of suitable gearing from a cross-shaft H, extending from end to end of the girder B and revolving in swiveling or flexible bearings *h*, carried by this girder. The preferred arrangement of gearing is that shown in the drawings. It consists of toothed wheels G G, fixed to the traveling wheels D D and driven by pinions *g g* on the cross-shaft H.

In order to insure a smooth and even longitudinal traverse and to prevent the skewing of the truck upon the gauntree-rails, the power for traversing the crane is applied at or near the center of the length of the main girder B. For this purpose we show a bevel-wheel I, mounted on the cross-shaft H at or near the center of the length of the latter. An electric motor K is placed on the main girder B, preferably at one end of same, as shown, and its framing is firmly bolted to the girder. From the motor K the power is transmitted through a light high-speed shaft L, revolving (at the same speed as the motor) in swiveling or flexible bearings *l*, carried by the web of the girder B to a suitable reduction-gear. The reduction-gear preferably employed is that shown in the drawings and consists of a worm M on the shaft L, gearing with a worm-wheel N. This worm-wheel is also framed with a ring of bevel-teeth O, meshing with the bevel-wheel I on the cross-shaft H. The latter being geared to the traveling wheels D D, as hereinbefore described, imparts the necessary longitudinal traversing motion to the crane. The high-speed shaft L can be caused to revolve in either direction, and consequently the crane traversed along the gauntree-rails in either direction at will, by the operation of a suitable motion-reversing gear P, carried by a bracket *p*, fixed to the web of the girder B, or by the employment of a direct-coupled reversible electric motor.

H' and L' are flexible shaft-couplings.

Q is a seat for the crane-driver.

The swiveling or flexible bearings *h* and *l* and the flexible couplings H' and L' obviate all liability of the shafts H and L being "seized" owing to deflection of the girder B.

The swiveling bearings *h* and *l* differ from one another, as also the flexible couplings H' and L', only in those respects which are determined by the different sizes and speeds of the respective shafts which they are designed to carry. A suitable construction of swiveling bearing is shown in Figs. 3, 4, and 5. The shaft H or L, as the case may be, is carried in a bearing proper, $r$, which is divided to admit the shaft and consists of an upper and a lower part bolted together. The bearing $r$ is carried by two vertical set-screws $s$, around which it is capable of swiveling in a horizontal plane. The screws $s$, which are mounted in a forked casting $t$, also permit of vertical adjustment of the shaft. The forked casting $t$ is rotatably supported by means of its spindle $t'$ in a base-casting $u$, which is adapted to be fixed to the girder. A peripheral groove $t^2$ is formed in the spindle $t'$ to take the end of a set-screw $s'$, mounted in the base-casting. This screw $s'$ permits of rotary motion of the spindle $t'$ (and consequently also of the fork-casting $t$ and the bearing $r$ with its shaft) in a vertical plane, while preventing axial motion of the same.

In the construction of the flexible couplings H' and L', (shown in Figs. 6 and 7,) $v$ $v$ are two flanged coupling-sleeves keyed on the ends of the shaft portions which they are required to couple together for the purpose of transmitting rotary motion. Between the adjacent faces of the two sleeves there is interposed a disk $w$, of vulcanized fiber, hard wood, or any suitable slightly-flexible substance. The torsional strain is transmitted from one sleeve to the other sleeve through the coupling-bolts $x$. These bolts are fitted with nuts bearing upon spring-washers $y$, whose elasticity, together with the slight compression of the disk $w$, permits of the slight flexibility of the coupling that is required in order to eliminate binding due to the deflection of the girders carrying the shaft.

By means of our invention we obtain in the traversing of an electric overhead traveling crane along its gauntree an even and smooth motion and cause the traveling wheels coupled to each end of the cross-shaft to begin revolving at the same instant, thereby obviating the skewing and consequent racking strains which are imparted to the framing or truck of a crane when the power for rotating the cross-shaft is applied at one end of the said shaft. We are also enabled by placing the motor at the end of the girder, as shown, and using the before-mentioned high-speed shaft to get the whole of the shafting, brackets, and gearing close up to the web of the girder, thereby relieving the said girder of the side or torsional strain due to the usual overhang of the cross-shaft, brackets, and gearing employed for this purpose. By applying the power for driving at or near the center of its length we are also enabled to considerably reduce the size and weight of the said cross-shaft and its bearings. We also concentrate the whole of the parts on the outside of one of the girders, as shown, so that this motion is entirely independent of the crab and does not offer any impediment to the free travel of the latter from end to end of the girders.

What we claim, and desire to secure by Letters Patent, is—

1. In apparatus for producing the traversing motion of an electric overhead traveling crane, the combination of an electric motor fixed on the crane-girder, a high-speed shaft conveying power from said motor to reduction-gear situated at approximately the middle of the crane-girder, the said reduction-gear, and a cross-shaft receiving motion from said reduction-gear and coupled to the traveling wheels at both ends of the crane, substantially as hereinbefore described.

2. In apparatus for producing the traversing motion of an electric overhead traveling crane and having a cross-shaft coupled to the traveling wheels at both ends of the crane and having a high-speed shaft driving said cross-shaft through intermediate reduction-gear as hereinbefore described, the combination with said cross-shaft and said high-speed shaft of flexible couplings and swiveling bearings whereby liability of the "seizing" of said shafts owing to deflection of the main girder is obviated, substantially as set forth.

3. In apparatus for producing the traversing motion of an electric overhead traveling crane, the combination of an electric motor fixed at approximately one end of one of the main girders, a high-speed shaft conveying power from said motor, reduction-gear situated at approximately the middle of said girder and receiving motion from said high-speed shaft, and a cross-shaft receiving motion from said reduction-gear and coupled to the traveling wheels at both ends of the crane, whereby the gearing for operating the traversing motion can be placed close up to the web of said girder and the usual twist on the girder and consequent vibration are reduced, substantially as hereinbefore described.

In witness whereof we have hereunto signed our names in the presence of two subscribing witnesses.

JOHN GEORGE FIEGEHEN.
EDWARD GEORGE FIEGEHEN.

Witnesses:
JOSEPH WILLISON,
FREDERICK AUGUSTUS TAYLOR.